United States Patent
Bosch

(10) Patent No.: US 7,243,947 B2
(45) Date of Patent: Jul. 17, 2007

(54) AIR BAG

(75) Inventor: Jerome Bosch, Clinton Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 32 days.

(21) Appl. No.: 10/908,771

(22) Filed: May 25, 2005

(65) Prior Publication Data

US 2006/0186647 A1   Aug. 24, 2006

Related U.S. Application Data

(60) Provisional application No. 60/593,856, filed on Feb. 18, 2005.

(51) Int. Cl.
*B60R 21/16* (2006.01)

(52) U.S. Cl. .................................. 280/743.1

(58) Field of Classification Search ............. 280/743.1, 280/743.2
See application file for complete search history.

(56) References Cited

U.S. PATENT DOCUMENTS

| | | | |
|---|---|---|---|
| 5,282,646 A | 2/1994 | Melvin et al. | 280/729 |
| 5,599,041 A | 2/1997 | Turnbull et al. | 280/724 |
| 6,019,390 A | 2/2000 | Keshavaraj | 280/743.1 |
| 6,158,765 A | 12/2000 | Sinnhuber | 280/728.3 |
| 6,176,512 B1 | 1/2001 | Rodriguez | 280/728.2 |
| 6,428,042 B1 | 8/2002 | Fischer et al. | 280/739 |
| 6,460,878 B2 | 10/2002 | Eckert et al. | 280/730.1 |
| 6,523,855 B2 | 2/2003 | Musiol et al. | 280/729 |
| 2003/0034637 A1 | 2/2003 | Wang et al. | 280/729 |
| 2003/0201628 A1 | 10/2003 | Roychoudhury et al. | 280/729 |
| 2004/0145160 A1 | 7/2004 | Hasebe et al. | 280/729 |
| 2004/0145161 A1 | 7/2004 | Hasebe et al. | 280/729 |
| 2004/0155439 A1 | 8/2004 | Hasebe et al. | 280/729 |
| 2004/0155440 A1 | 8/2004 | Hasebe et al. | 280/729 |

FOREIGN PATENT DOCUMENTS

| | | |
|---|---|---|
| DE | 198 60 804 A1 | 7/2000 |
| EP | 1 364 838 A2 | 11/2003 |
| EP | 1 452 403 A1 | 1/2004 |

*Primary Examiner*—Faye M. Fleming
(74) *Attorney, Agent, or Firm*—Foley & Lardner LLP

(57) ABSTRACT

A central panel forming a duct of an airbag is operatively coupled to first and second lateral inboard panels and to first and second lateral outboard panels, and the associated inboard and outboard panels are operatively coupled to one another, so as to form first and second air bag cushion portions that are split across a central portion of the air bag and separated by a central gap. The central gap is adapted to provide for mitigating injury to an out of position occupant. The central portion of the air bag may be adapted with sufficient depth so as to provide sufficient restraint for a relatively large occupant.

17 Claims, 11 Drawing Sheets

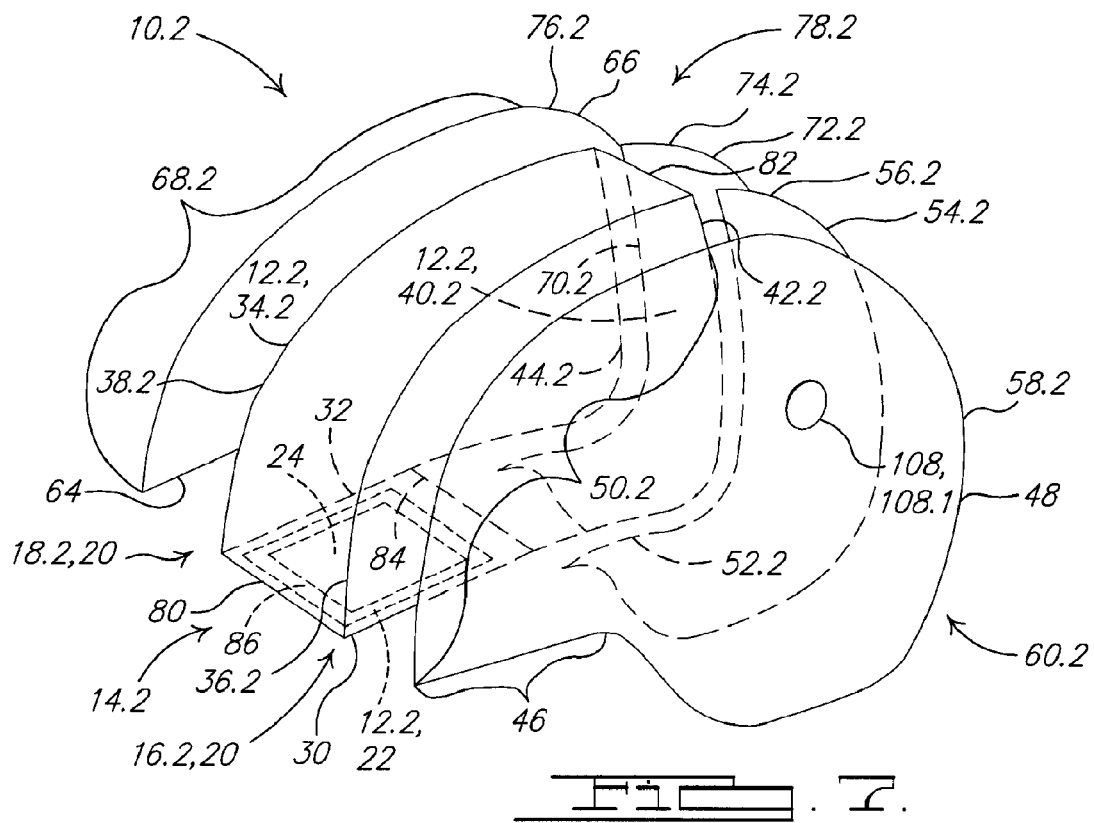
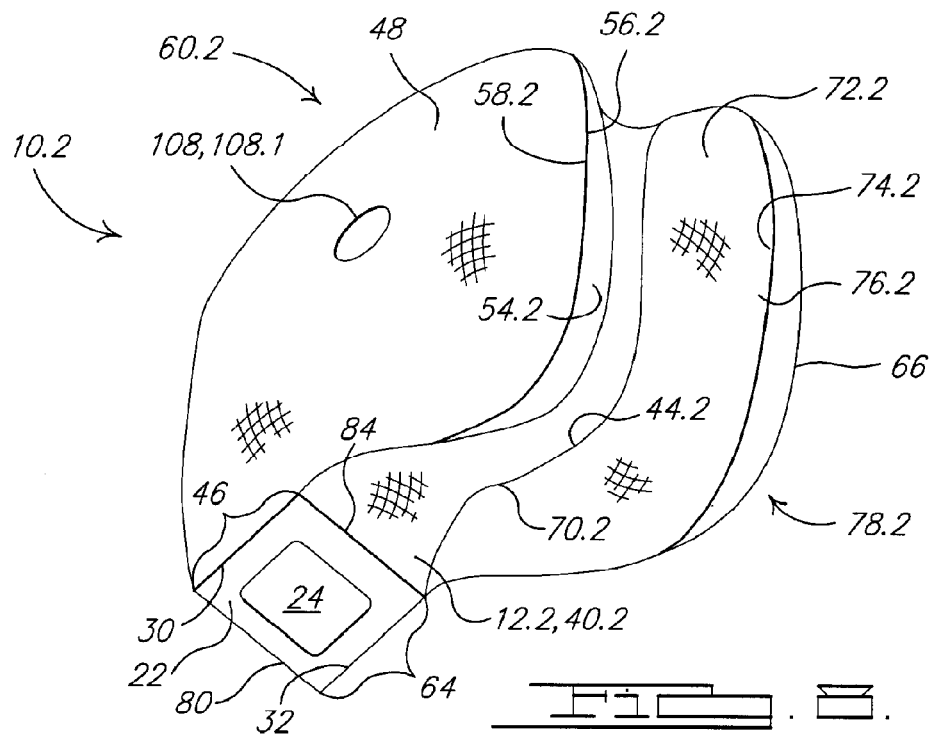

AIR BAG

CROSS-REFERENCE TO RELATED APPLICATIONS

The instant application claims the benefit of prior U.S. Provisional Application Ser. No. 60/593,856 filed on Feb. 18, 2005, which is incorporated herein by reference.

BRIEF DESCRIPTION OF THE DRAWINGS

In the accompanying drawings:

FIG. 7 illustrates an exploded view of a first embodiment of a second aspect of an air bag;

FIG. 8 illustrates an isometric view of the first embodiment of the second aspect of the air bag in an inflated condition;

DESCRIPTION OF EMBODIMENT(S)

Figure 1:
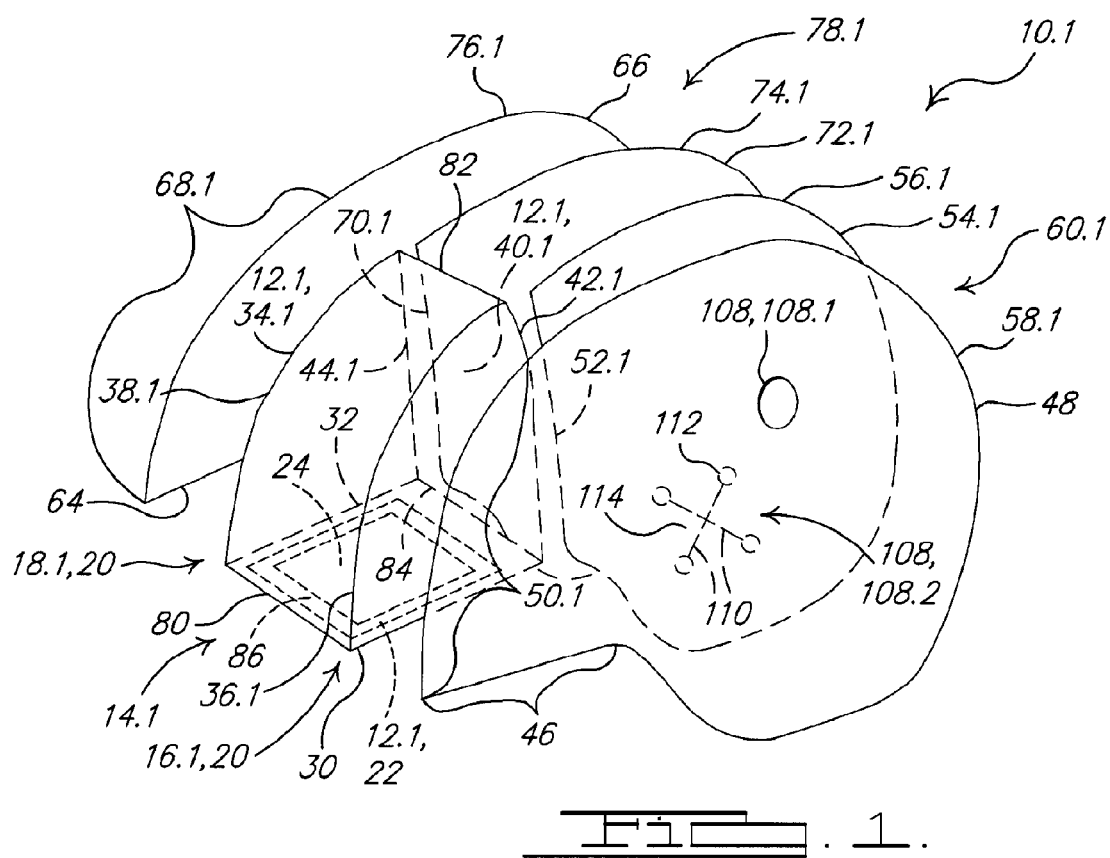
FIG. 1 illustrates an exploded view of a first aspect of an air bag.

Referring to FIGS. 1-4, a first aspect of an air bag 10.1 comprises a central panel 12.1 adapted so as to form a duct 14.1 with first 16.1 and second 18.1 openings at opposite ends 20 of the duct 14.1. A first portion 22 of the central panel 12.1 incorporates a third opening 24 adapted to receive inflation gas from a gas generator 26 of an air bag inflator module 28. The first portion 22 of the central panel 12.1 comprises first 30 and second 32 edges respectively common with the first 16.1 and second 18.1 openings of the duct 14.1. A second portion 34.1 of the at least one central panel 12.1 is operatively coupled to the first portion 22 thereof, and comprises first 36.1 and second 38.1 edges respectively common with the first 16.1 and second 18.1 openings of the duct 14.1. A third portion 40.1 of the at least one central panel 12.1 is operatively coupled to the first 22 and second 34.1 portions thereof, and comprises first 42.1 and second 44.1 edges respectively common with the first 16.1 and second 18.1 openings of the duct 14.1.

A first edge portion 46 of a first lateral outboard panel 48 is operatively coupled to the first edge 30 of the first portion 22 of the central panel 12.1, and a second edge portion 50.1 of the first lateral outboard panel 48 is operatively coupled to the first edge 36.1 of the second portion 34.1 of the central panel 12.1. A first edge portion 52.1 of a first lateral inboard panel 54.1 is operatively coupled to the first edge 42.1 of the third portion 40.1 of the central panel 12.1, and a remaining edge portion 56.1 of the first lateral inboard panel 54.1 is operatively coupled to a remaining edge portion 58.1 of the first lateral outboard panel 48, wherein the first lateral inboard panel 54.1 and the first lateral outboard panel 48 bound a first air bag cushion portion 60.1 that is adapted to provide for cushioning an impact of an occupant 62 or object therewith.

A first edge portion 64 of a second lateral outboard panel 66 is operatively coupled to the second edge 32 of the first portion 22 of the central panel 12.1, and a second edge portion 68.1 of the second lateral outboard panel 66 is operatively coupled to the second edge 38.1 of the second portion 34.1 of the central panel 12.1. A first edge portion 70.1 of a second lateral inboard panel 72.1 is operatively coupled to the second edge 44.1 of the third portion 40.1 of the central panel 12.1, and a remaining edge portion 74.1 of the second lateral inboard panel 72.1 is operatively coupled to a remaining edge portion 76.1 of the second lateral outboard panel 66, wherein the second lateral inboard panel 72.1 and the second lateral outboard panel 66 bound a second air bag cushion portion 78.1 that is adapted to provide for cushioning an impact of the occupant 62 or object therewith.

The air bag 10.1, and more particularly, the central panel 12.1, first 48 and second 66 lateral outboard panels, and the first 54.1 and second 72.1 lateral inboard panels, are constructed of air bag material known in the art, for example, a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gases generated by the gas generator 26 and for interacting with an occupant so as to provide for occupant restraint. The central panel 12.1, first 48 and second 66 lateral outboard panels, and the first 54.1 and second 72.1 lateral inboard panels may either be separate pieces that are joined by, for example, sewing, bonding or welding, or they may be part of a single piece air bag 10.1 that is either joined together or molded, e.g. a blow-molded air bag 10.1, or a multiple component air bag 10.1 that is either joined together or molded. Accordingly, as used herein to describe the connections of the central panel 12.1, first 48 and second 66 lateral outboard panels, and the first 54.1 and second 72.1 lateral inboard panels, the term "operatively coupled" can mean either a joining of separate pieces by a separate operation, or portions of a continuous piece of air bag material, for example, as would result from a molding process.

Furthermore, the central panel 12.1, first 48 and second 66 lateral outboard panels, and the first 54.1 and second 72.1 lateral inboard panels may each be constructed from either a single piece of air bag material, or an assemblage of a plurality of pieces. For example, the central panel 12.1 may be cut from a single piece of air bag material that is formed into the duct 14.1 by joining the ends thereof, for example, by sewing along any of the boundaries 80, 82, 84 between the first 22 and second 34.1 portions, the second 34.1 and third 40.1 portions, or between the first 22 and third 40.1 portions, respectively, or at any location therebetween. Furthermore, one or more of the first 22, second 34.1 or third 40.1 portions of the central panel 12.1 may be constructed from a separate piece of air bag material that is joined to the other portions (22, 34.1, 40.1).

The third opening 24 in the first portion 22 of the central panel 12.1 may be suitably reinforced with one or more reinforcement patches 86—e.g. of air bag material as hereinabove described—operatively coupled to the first portion 22 of the central panel 12.1—e.g. by sewing, bonding or welding—around the third opening 24 therein, so as to strengthen the air bag 10.1 at the attachment thereof to the associated air bag inflator module 28, thereby providing for maintaining the integrity of the air bag 10.1 throughout the associated inflation and restraint processes.

Figure 3:
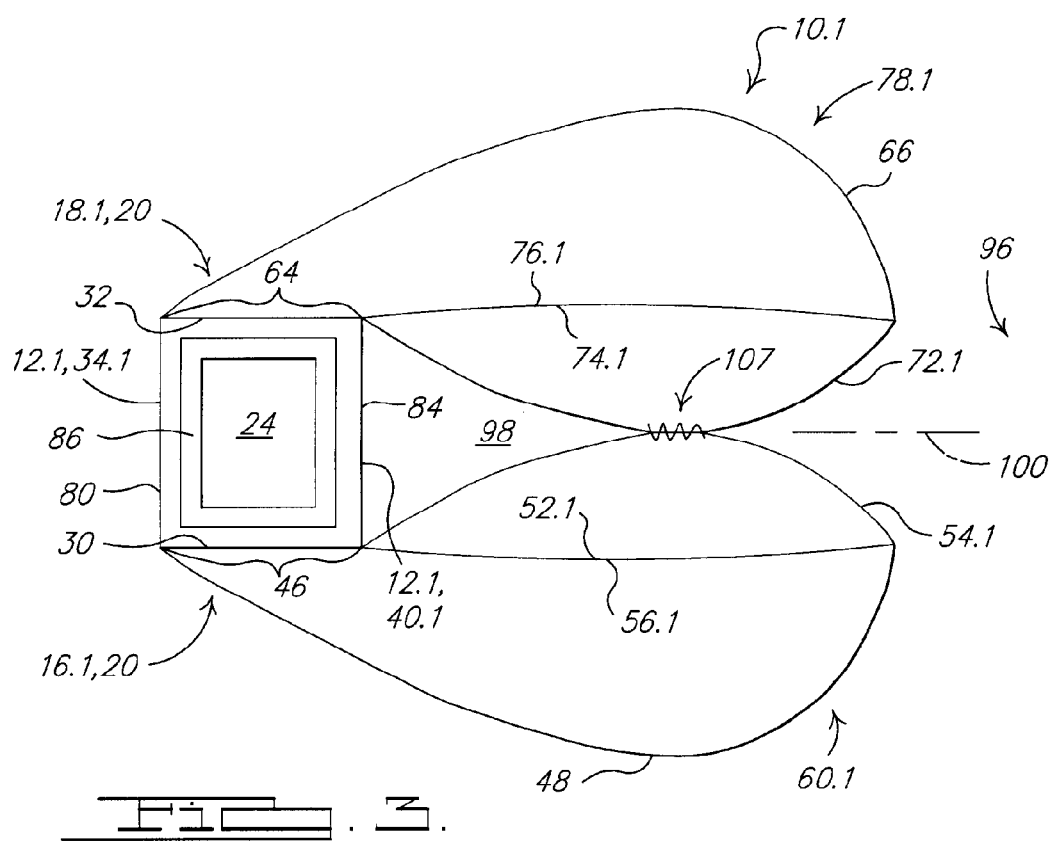
FIG. 3 illustrates a top cross-sectional view of the first aspect of the air bag in an inflated condition.
Figure 4:
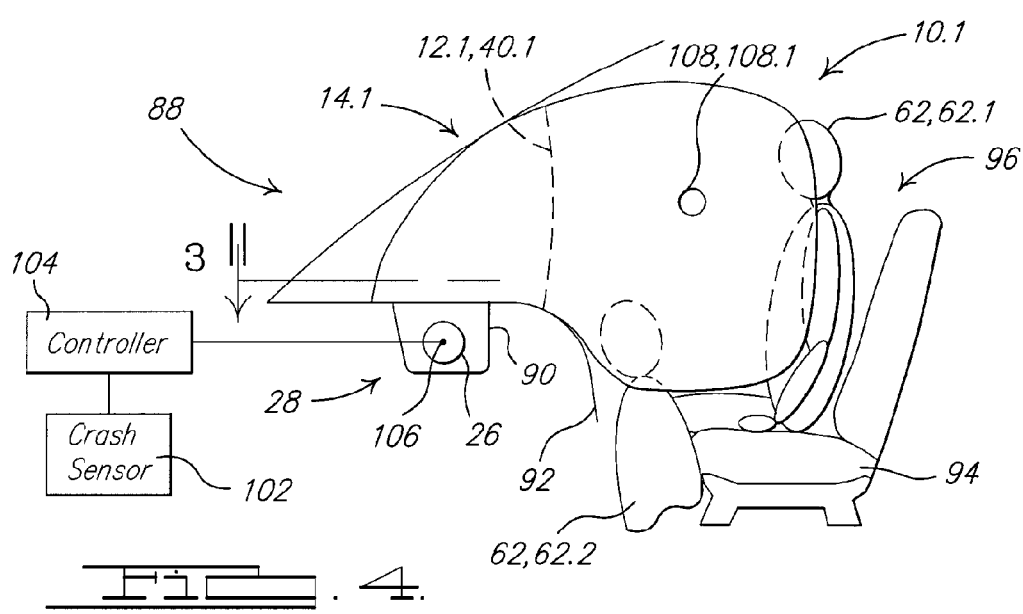
FIG. 4 illustrates a side view of the first aspect of the air bag incorporated in a vehicle, and further illustrates the interaction thereof with an adult occupant and an out-of-position child occupant.

Referring to FIGS. 3 and 4, the air bag 10.1 is illustrated in a top-mount configuration in a vehicle 88, wherein the perimeter of the third opening 24 of the air bag 10.1 is attached to the housing 90 of an air bag inflator module 28 located below a top side of the instrument panel 92. The air bag inflator module 28 is located so as to provide for protecting an occupant 62 located on or proximate to a seat 94 at an associated seating location 96. More particularly, the air bag inflator module 28 is laterally positioned so that the central gap 98 between the first 60.1 and second 78.1 air bag cushion portions is substantially aligned with the center 100 of the associated seating location 96. The air bag 10.1 is inflated by the gas generator 26 of the air bag inflator module 28 responsive to the detection by a crash sensor 102 of a crash of the vehicle 88, and the resulting generation of an actuation signal by a controller 104 operatively associated therewith, whereby the actuation signal is coupled to an igniter 106 of the gas generator 26 causing an actuation thereof, whereby gas generated by the gas generator 26 causes the air bag 10.1 to inflate, thereby providing for mitigation of injury to an occupant 62 of the vehicle 88 at a seating location associated with the air bag inflator module 28, without adversely affecting the dynamic restraint capability of the air bag 10.1 under relatively high speed crash conditions for a relatively large occupant 62.1, in accordance with government automotive safety regulations. FIG. 4 illustrates an out-of-position (OOP) occupant 62.2 positioned so as to be susceptible to injury by the inflation of an air bag inflator module 28 if the air bag inflator module 28 were not otherwise adapted to mitigate injury to such an out-of-position (OOP) occupant 62.2.

In operation, the central gap 98 provides for reducing neck loads to an out-of-position (OOP) occupant 62.2 by causing the air bag 10.1 to inflate around the out-of-position (OOP) occupant 62.2. Referring to FIG. 3, the first 54.1 and second 72.1 lateral inboard panels are coupled together with localized reinforced stitching 107 at a location that provides for a bi-lobular shaped inflated air bag 10.1, so as to provide for restraining an occupant 62 who interacts with the central gap 98 of the first 60.1 and second 78.1 air bag cushion portions. Accordingly, a relatively large occupant aligned with the central gap 98 interacts with the inflated first 54.1 and second 72.1 lateral inboard panels during deployment so that the resulting loading is applied mostly to the collarbone area of the occupant without over-constraining the head, neck and chest, whereas the relatively upper region of the central portion of the air bag 10.1 provides for adequate restraint for the head and neck later in the crash event, and limits the forward motion of the head so as to reduce the chances of the head bottoming out on a surface of the instrument panel 92.

Figure 2:
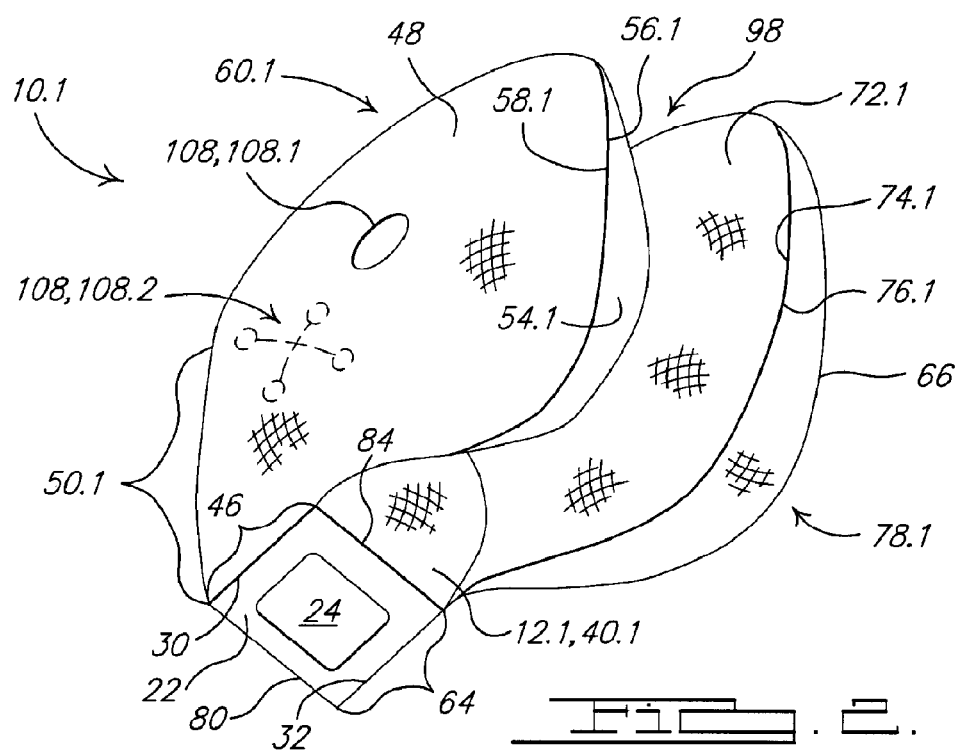
FIG. 2 illustrates an isometric view of the first aspect of the air bag in an inflated condition.

Referring to FIGS. 1 and 2, the air bag 10.1 is provided with one or more vents 108 in one or both of the first 48 and second 66 lateral outboard panels, so as to provide for venting inflation gas from the air bag 10.1 upon interaction of the occupant 62 or object therewith, responsive to a crash, so as to provide for dissipating the energy of the occupant 62 or object within the vehicle 88. For example, FIGS. 1 and 2 illustrate an orifice vent 108.1, and what is known as an X-vent 108.2, wherein the orifice vent 108.1 and the X-vent 108.2 may be used either in the alternative or in combination, the orifice vent 108.1 comprises a predefined orifice in the air bag material, and the X-vent 108.2 comprises a plurality of cuts 110 in the air bag material—possibly in combination with stress-relief holes 112 at the ends of the cuts 110—whereby flaps 114 between the cuts are deflected by the outflow of inflation gas from the air bag 10.1, so as to provide for venting the inflation gas from the air bag 10.1.

Figure 5:
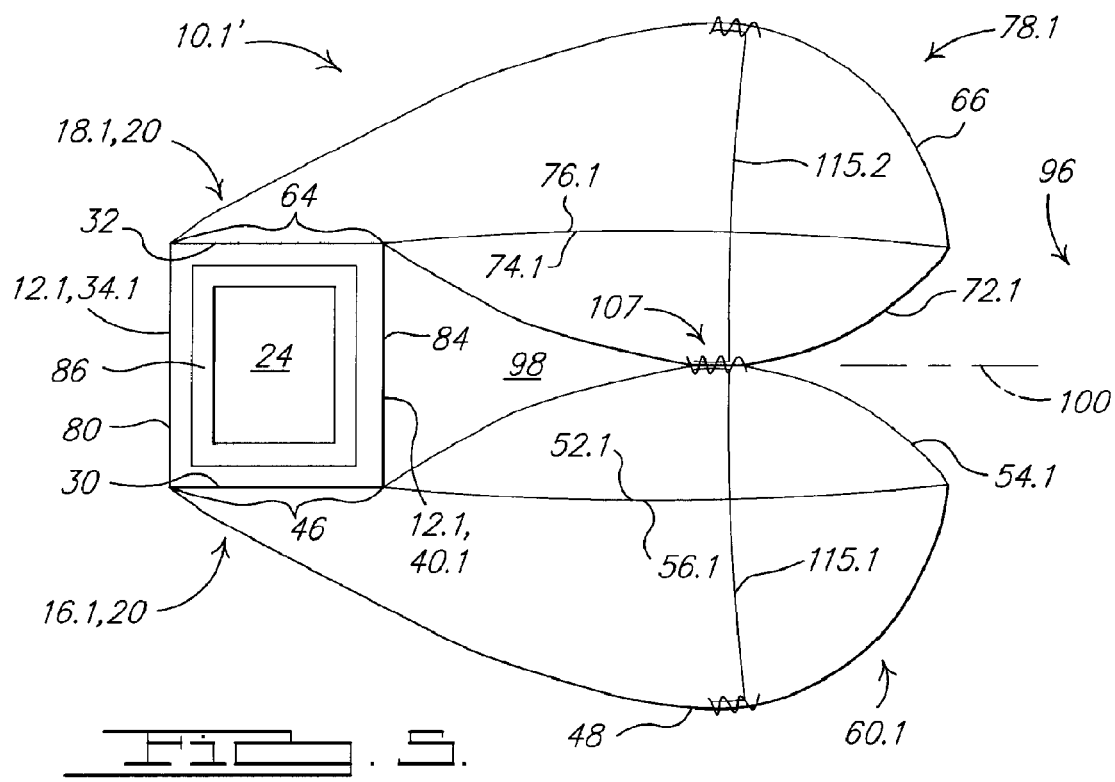
FIG. 5 illustrates a top cross-sectional view of a second embodiment of the first aspect of the air bag in an inflated condition.

Referring to FIG. 5, a second embodiment of the first aspect of an air bag 10.1' incorporates first 115.1 and second 115.2 cross-tethers within the respective first 60.1 and second 78.1 air bag cushion portions so as to control lateral spreading of the first 60.1 and second 78.1 air bag cushion portions responsive to restraint loading, wherein the respective inner portions of the first 115.1 and second 115.2 cross-tethers are each secured to one another with the localized reinforced stitching 107 that also provides for restraining an occupant 62 who interacts with the central gap 98 of the first 60.1 and second 78.1 air bag cushion portions, and the outer portions of the first 115.1 and second 115.2 cross-tethers are each secured to the corresponding associated first 48 and second 66 lateral outboard panels.

Figure 6:
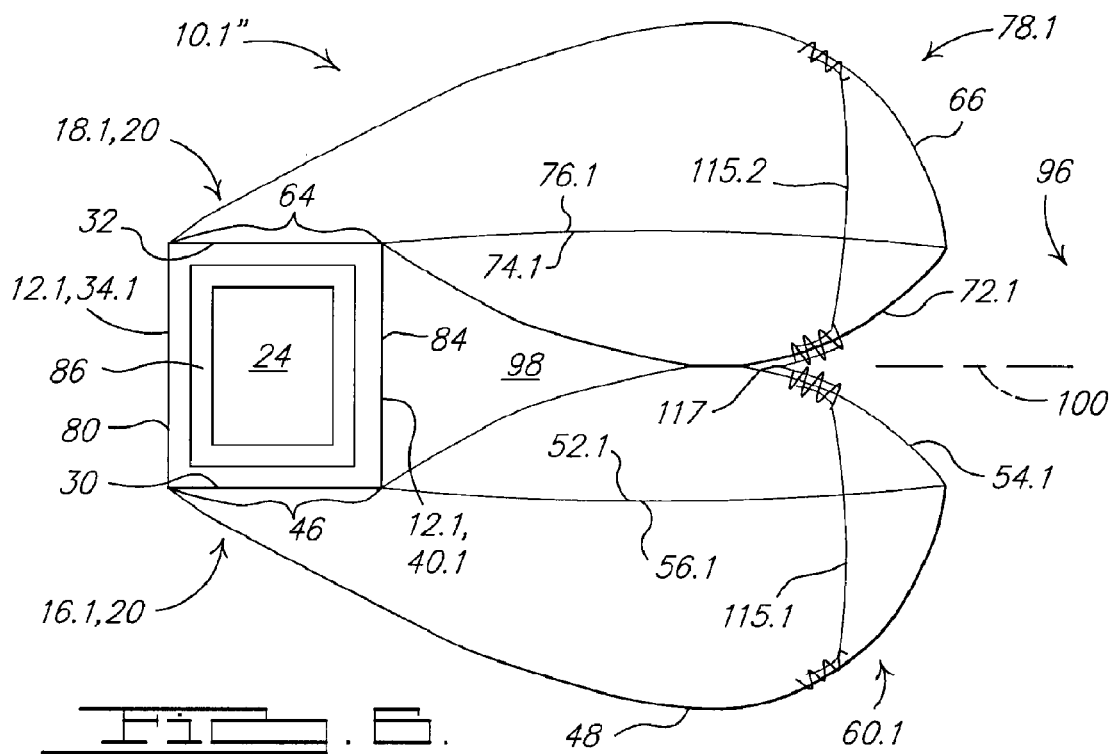
FIG. 6 illustrates a top cross-sectional view of a third embodiment of the first aspect of the air bag in an inflated condition.

Referring to FIG. 6, a third embodiment of the first aspect of an air bag 10.1" incorporates first 115.1 and second 115.2 cross-tethers within the respective first 60.1 and second 78.1 air bag cushion portions so as to control lateral spreading of the first 60.1 and second 78.1 air bag cushion portions responsive to restraint loading, wherein the respective inner portions of the first 115.1 and second 115.2 cross-tethers are secured to an associated external web panel 11 7 with associated stitching through associated portions of the first 54.1 and second 72.1 lateral inboard panels, wherein the web panel 117 provides preventing an occupant 62 who interacts with the central gap 98 of the first 60.1 and second 78.1 air bag cushion portions.

Referring to FIGS. 7-12, a first embodiment of a second aspect of an air bag 10.2 comprises a central panel 12.2 adapted so as to form a duct 14.2 with first 16.2 and second 18.2 openings at opposite ends 20 of the duct 14.2. A first portion 22 of the central panel 12.2 incorporates a third opening 24 adapted to receive inflation gas from a gas generator 26 of an air bag inflator 28, and comprises first 30 and second 32 edges respectively common with the first 16.2 and second 18.2 openings of the duct 14.2. A second portion 34.2 of the at least one central panel 12.2 is operatively coupled to the first portion 22 thereof, and comprises first 36.2 and second 38.2 edges respectively common with the first 16.2 and second 18.2 openings of the duct 14.2. A third portion 40.2 of the at least one central panel 12.2 is operatively coupled to the first 22 and second 34.2 portions thereof, and comprises first 42.2 and second 44.2 edges respectively common with the first 16.2 and second 18.2 openings of the duct 14.2.

Figure 10:
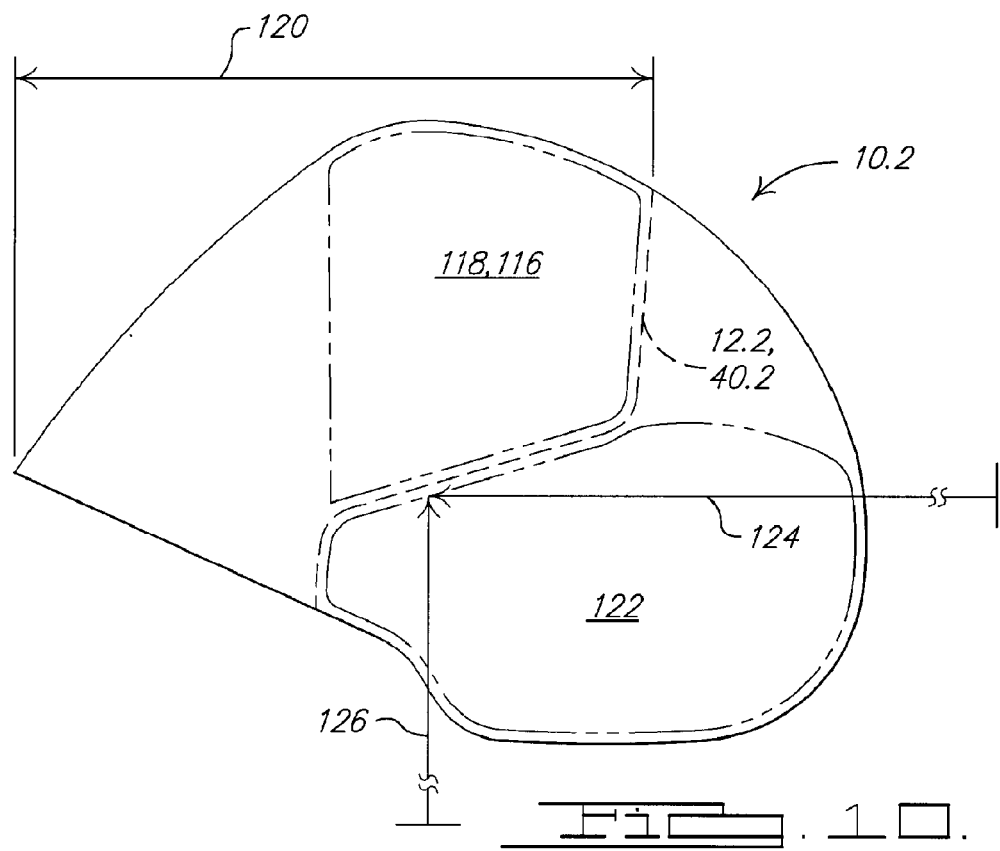
FIG. 10 illustrates a side view of the second aspect of the air bag, and further illustrates various protection zones thereof.
Figure 11:
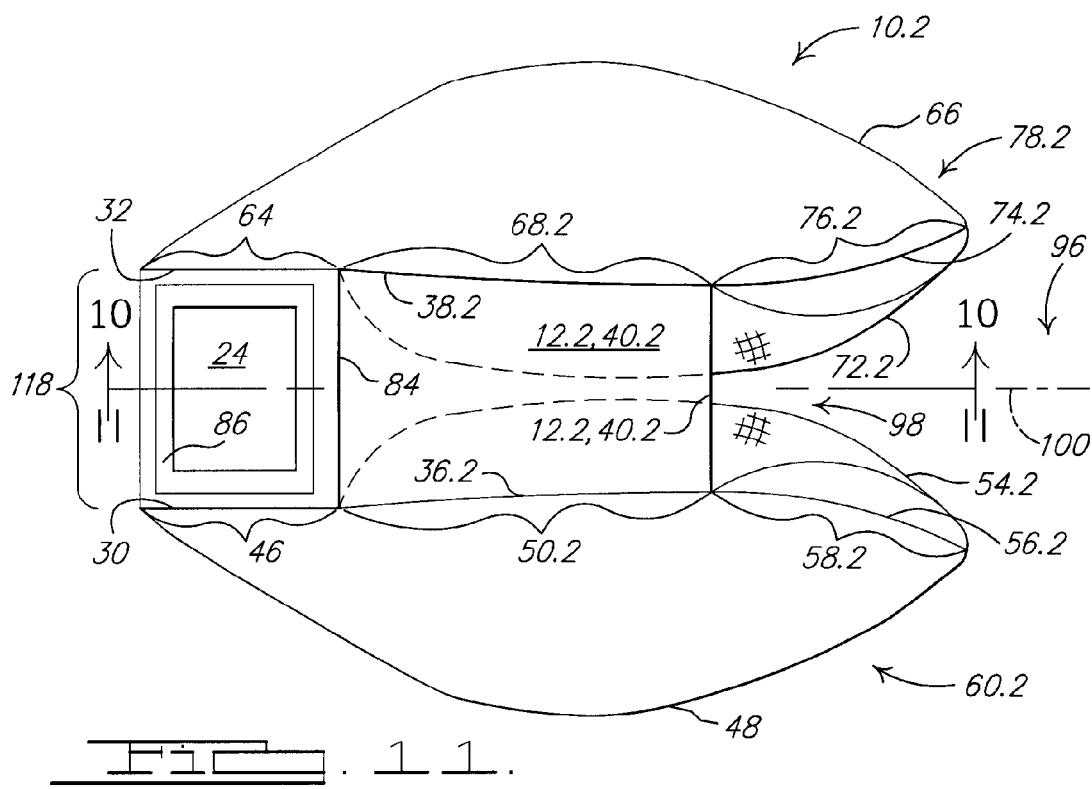
FIG. 11 illustrates a top cross-sectional view of the first embodiment of the second aspect of the air bag in an inflated condition.
Figure 12:
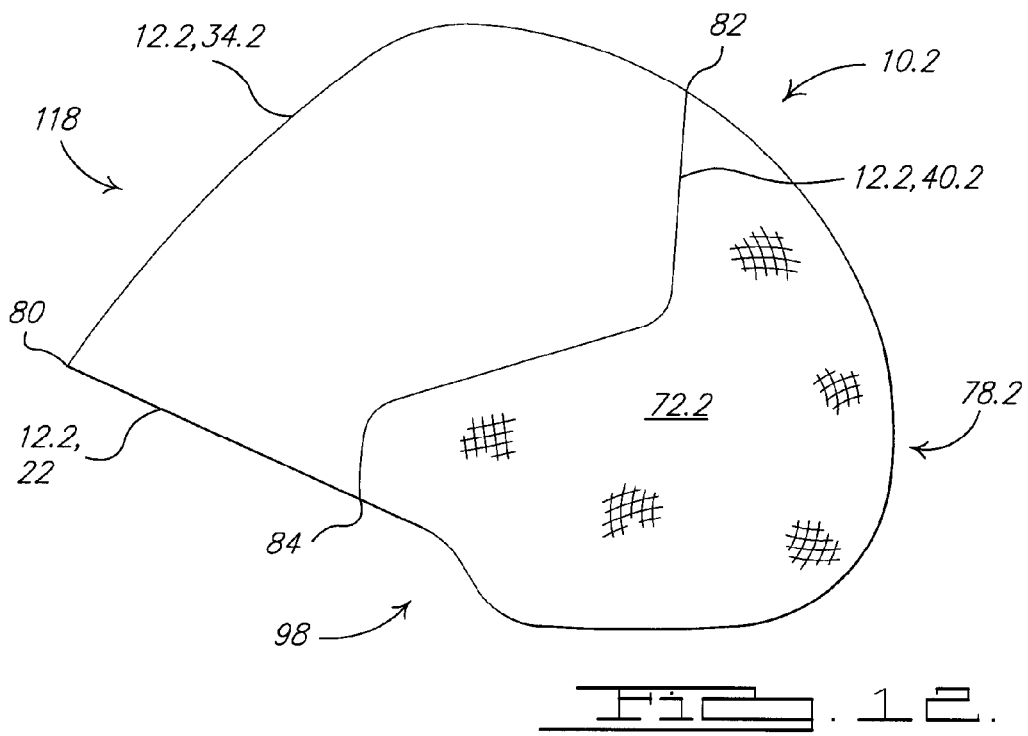
FIG. 12 illustrates a side cross-sectional view of the second aspect of the air bag in an inflated condition.
Figure 13:
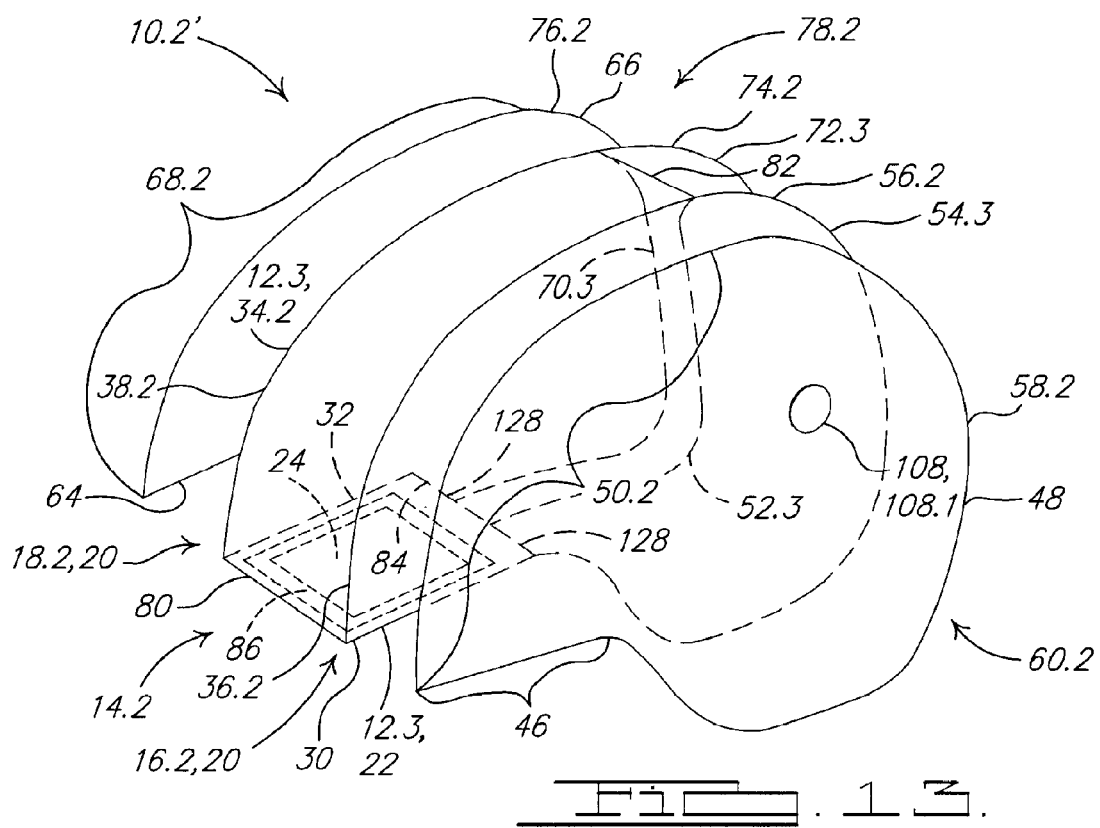
FIG. 13 illustrates an exploded view of a second embodiment of a second aspect of an air bag.
Figure 14:
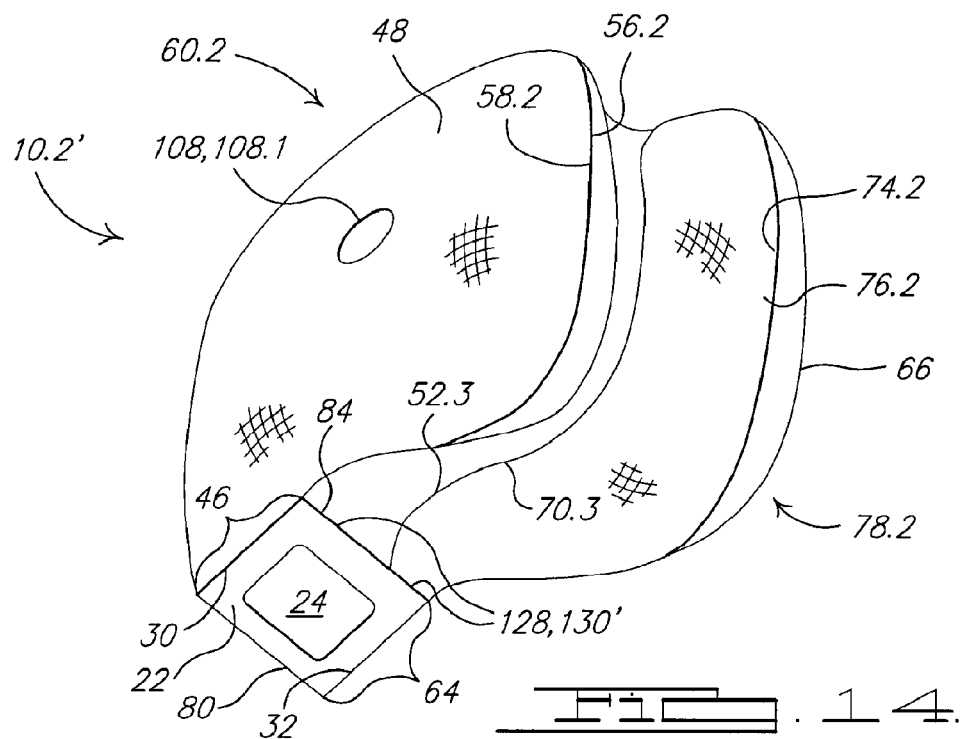
FIG. 14 illustrates an isometric view of the second embodiment of the second aspect of the air bag in an inflated condition.

Referring to FIG. 10, the contour of the attachment of the third portion 40.2 of the at least one central panel 12.2 to the associated first 54.2 and second 72.1 lateral inboard panels is adapted so as to provide for a relatively upper region 116 of the central portion 118 of the air bag 10.2 of sufficient depth 120 so as to provide for dynamic restraint of a relatively large occupant 62.1, and so as to provide for a relatively lower region 122 between the first 60.1 and second 78.1 air bag cushion portions of sufficient depth 124 and height 126 so as to provide for mitigating injury to an out-of-position (OOP) occupant 62.2 during the inflation of the air bag 10.2.

A first edge portion 46 of a first lateral outboard panel 48 is operatively coupled to the first edge 30 of the first portion 22 of the central panel 12.2, and a second edge portion 50.2 of the first lateral outboard panel 48 is operatively coupled to the first edge 36.2 of the second portion 34.2 of the central panel 12.2. A first edge portion 52.2 of a first lateral inboard panel 54.2 is operatively coupled to the first edge 42.2 of the third portion 40.2 of the central panel 12.2, and a remaining edge portion 56.2 of the first lateral inboard panel 54.2 is operatively coupled to a remaining edge portion 58.2 of the first lateral outboard panel 48, wherein the first lateral inboard panel 54.2 and the first lateral outboard panel 48 bound a first air bag cushion portion 60.2 that is adapted to provide for cushioning an impact of an occupant 62 or object therewith.

A first edge portion 64 of a second lateral outboard panel 66 is operatively coupled to the second edge 32 of the first portion 22 of the central panel 12.2, and a second edge portion 68.2 of the second lateral outboard panel 66 is operatively coupled to the second edge 38.2 of the second portion 34.2 of the central panel 12.2. A first edge portion 70.2 of a second lateral inboard panel 72.2 is operatively coupled to the second edge 44.2 of the third portion 40.2 of the central panel 12.2, and a remaining edge portion 74.2 of the second lateral inboard panel 72.2 is operatively coupled to a remaining edge portion 76.2 of the second lateral outboard panel 66, wherein the second lateral inboard panel 72.2 and the second lateral outboard panel 66 bound a second air bag cushion portion 78.2 that is adapted to provide for cushioning an impact of the occupant 62 or object therewith.

Figure 9:
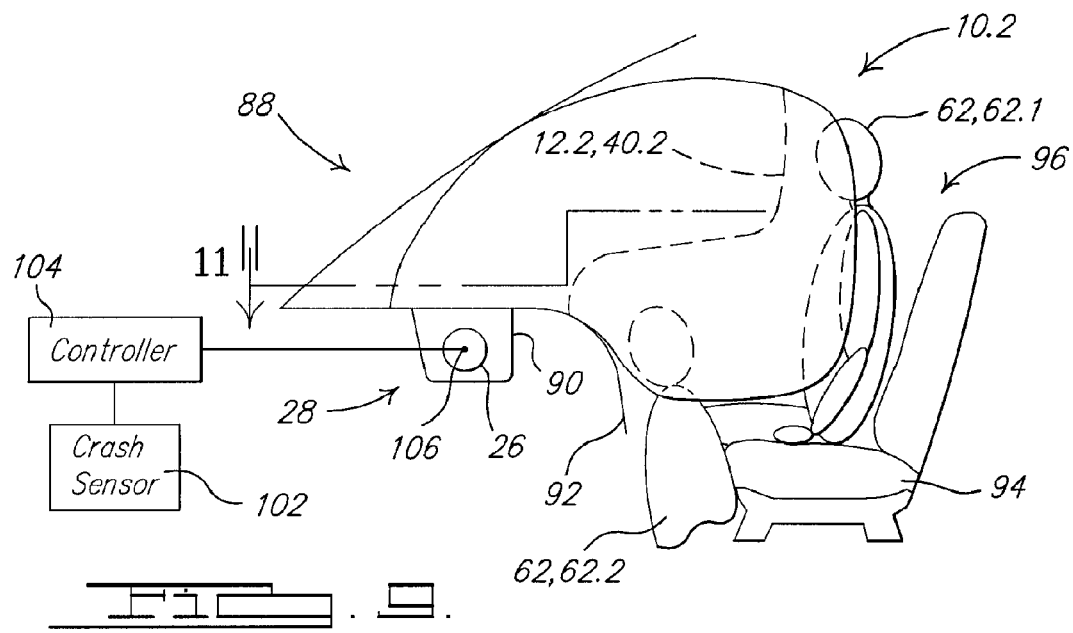
FIG. 9 illustrates a side view of the first embodiment of the second aspect of the air bag incorporated in a vehicle, and further illustrates the interaction thereof with an adult occupant and an out-of-position child occupant.

Referring to FIGS. 9-12, the air bag 10.2 is illustrated in a top-mount configuration in a vehicle 88, wherein the perimeter of the third opening 24 of the air bag 10.2 is attached to the housing 90 of an air bag inflator module 28 located below a top side of the instrument panel 92. The air bag inflator module 28 is located so as to provide for protecting an occupant 62 located on or proximate to a seat 94 at an associated seating location 96. More particularly, the air bag inflator module 28 is laterally positioned so that the central gap 98 between the first 60.1 and second 78.1 air bag cushion portions is substantially aligned with the center 100 of the associated seating location 96. The air bag 10.2 is inflated by the gas generator 26 of the air bag inflator module 28 responsive to the detection by a crash sensor 102 of a crash of the vehicle 88, and the resulting generation of an actuation signal by a controller 104 operatively associated therewith, whereby the actuation signal is coupled to an igniter 106 of the gas generator 26 causing an actuation thereof, whereby gas generated by the gas generator 26 causes the air bag 10.2 to inflate, thereby providing for mitigation of injury to an occupant 62 of the vehicle 88 at a seating location associated with the air bag inflator module 28, without adversely affecting the dynamic restraint capability of the air bag 10.2 under relatively high speed crash conditions for a relatively large occupant 62.1, in accordance with government automotive safety regulations. FIG. 9 illustrates an out-of-position (OOP) occupant 62.2 positioned so as to be susceptible to injury by the inflation of an air bag inflator module 28 if the air bag inflator module 28 were not otherwise adapted to mitigate injury to such an out-of-position (OOP) occupant 62.2.

In operation, the central gap 98 provides for reducing neck loads to an out-of-position (OOP) occupant 62.2 by causing the air bag 10.2 to inflate around the out-of-position (OOP) occupant 62.2, whereby the height 126 and depth 124 of the relatively lower region 122 between the first 60.1 and second 78.1 air bag cushion portions is adapted so as to avoid the interaction of the central portion 118 of the air bag 10.2 with a relatively small out-of-position (OOP) occupant 62.2. A relatively large occupant aligned with the central gap 98 interacts with the inflated first 54.2 and second 72.2 lateral inboard panels during deployment so that the resulting loading is applied mostly to the collarbone area of the occupant without over-constraining the head, neck and chest, whereas the relatively upper region 116 of the central portion 118 of the air bag 10.2 provides for adequate restraint for the head and neck later in the crash event, and limits the forward motion of the head so as to reduce the chances of the head bottoming out on a surface of the instrument panel 92. Referring to FIGS. 7 and 8, the air bag 10.2 is provided with one or more vents 108 in one or both of the first 48 and second 66 lateral outboard panels, so as to provide for venting inflation gas from the air bag 10.2 upon interaction of the occupant 62 or object therewith, responsive to a crash, so as to provide for dissipating the energy of the occupant 62 or object within the vehicle 88.

Accordingly, the air bag 10.1, 10.2 generally comprises split first 60.1, 60.2 and second 78.1, 78.2 air bag cushion portions that are joined by an associated central portion 118, wherein the central portion 118 acts as a duct 14.1, 14.2 by which the first 60.1, 60.2 and second 78.1, 78.2 air bag cushion portions are filled with inflation gas from the air bag inflator module 28, and the central portion 118 of the second aspect of the air bag 10.2 is adapted so as to provide for restraining a relatively large occupant 62.1 and to mitigate against injury to an out-of-position (OOP) occupant 62.2.

Referring to FIGS. 13, 14 and 17-21, a second embodiment of a second aspect of an air bag 10.2' is similar to the first embodiment of the second aspect of an air bag 10.2 described hereinabove except that the third portion 40.2 of the central panel 12.2 of the second panel is instead divided amongst the associated first 54.3 and second 72.3 lateral inboard panels, rather than being incorporated in the associated central panel 12.3. Accordingly, the first edge portion 52.3 of the first lateral inboard panel 54.3 is joined directly to the first edge portion 70.3 of the second lateral inboard panel 72.3, and edge portions 128 of the first 54.3 and second 72.3 lateral inboard panels are joined to corresponding edge portions 130 of the central panel 12.3.

Figure 15:
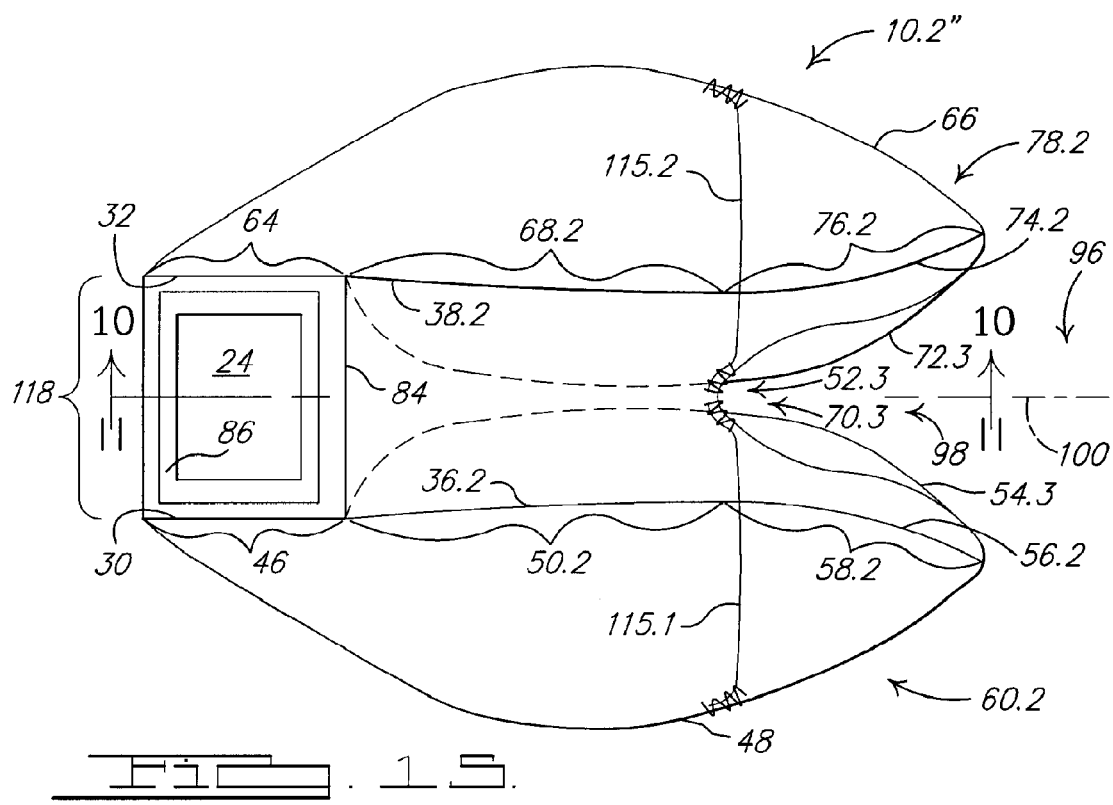
FIG. 15 illustrates a top cross-sectional view of a third embodiment of the second aspect of the air bag in an inflated condition.

Referring to FIG. 15, a third embodiment of a second aspect of an air bag 10.2" incorporates first 115.1 and second 115.2 cross-tethers within the corresponding associated first 60.2 and second 78.2 air bag cushion portions so as to control lateral spreading of the first 60.2 and second 78.2 air bag cushion portions responsive to restraint loading, wherein the respective inner portions of the first 115.1 and second 115.2 cross-tethers are each secured to the corresponding associated first 54.3 and second 72.3 lateral inboard panels, and the outer portions of the first 115.1 and second 115.2 cross-tethers are each secured to the corresponding associated first 48 and second 66 lateral outboard panels.

Figure 16:
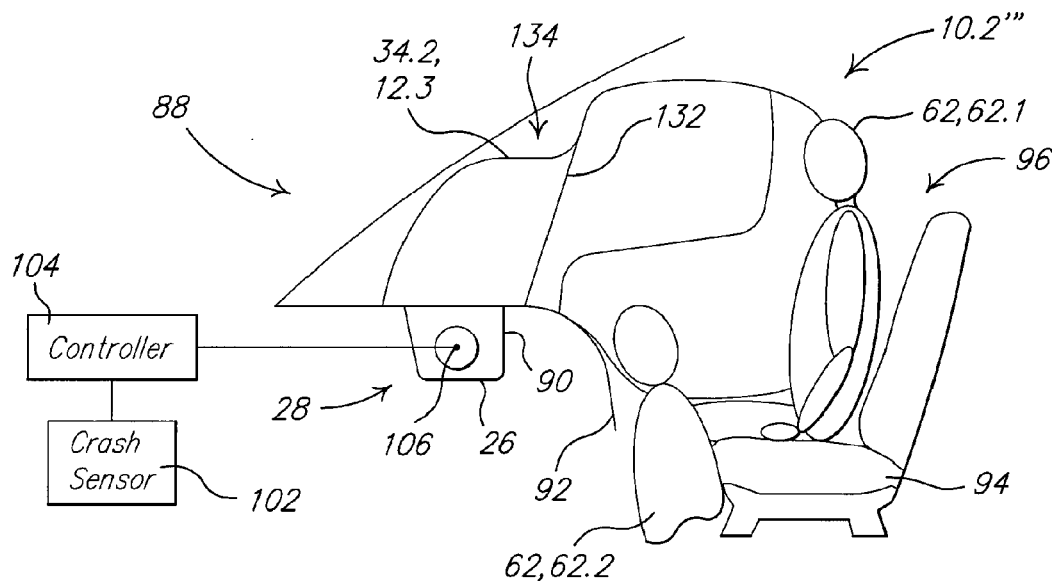
FIG. 16 illustrates a side view of a fourth embodiment of the second aspect of the air bag incorporated in a vehicle, and further illustrates the interaction thereof with an adult occupant and an out-of-position child occupant.
Figure 17:
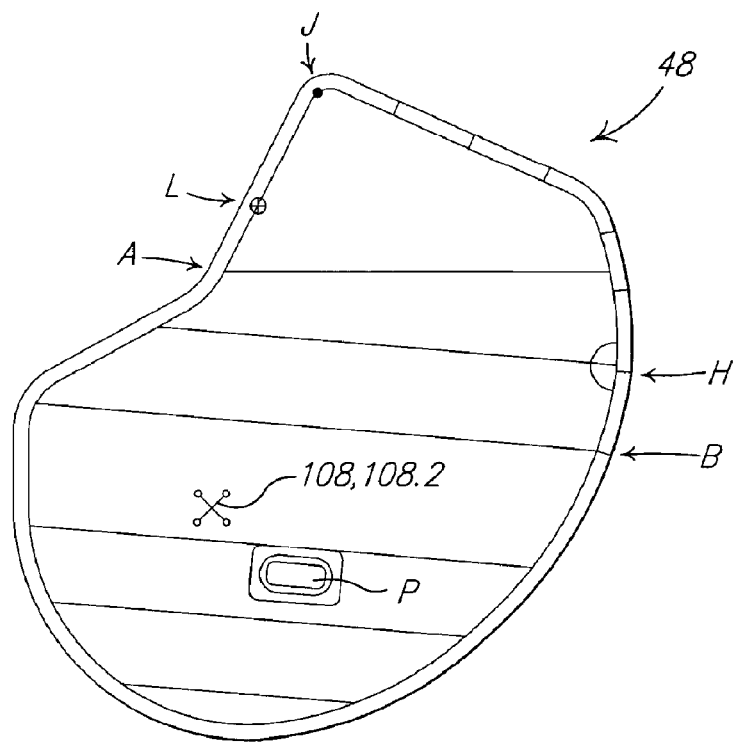
FIG. 17 illustrates a pattern of first lateral outboard panel of the second embodiment of the second aspect of the air bag.
Figure 18:
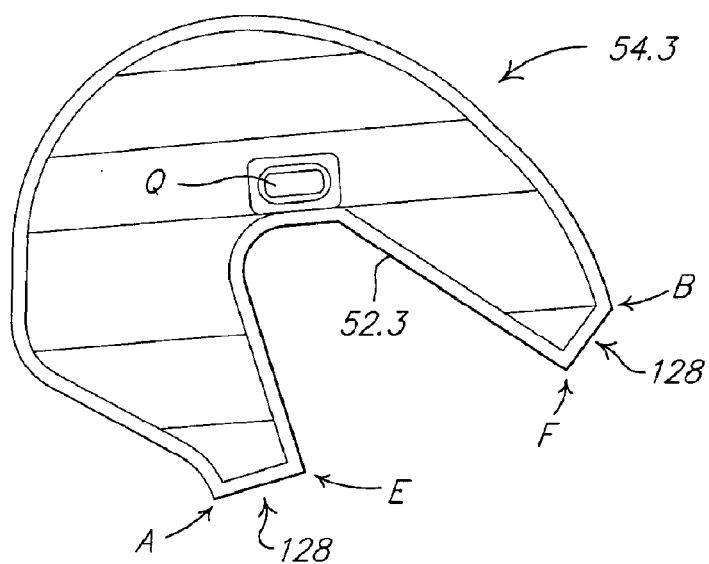
FIG. 18 illustrates a pattern of first lateral inboard panel of the second embodiment of the second aspect of the air bag.
Figure 19:
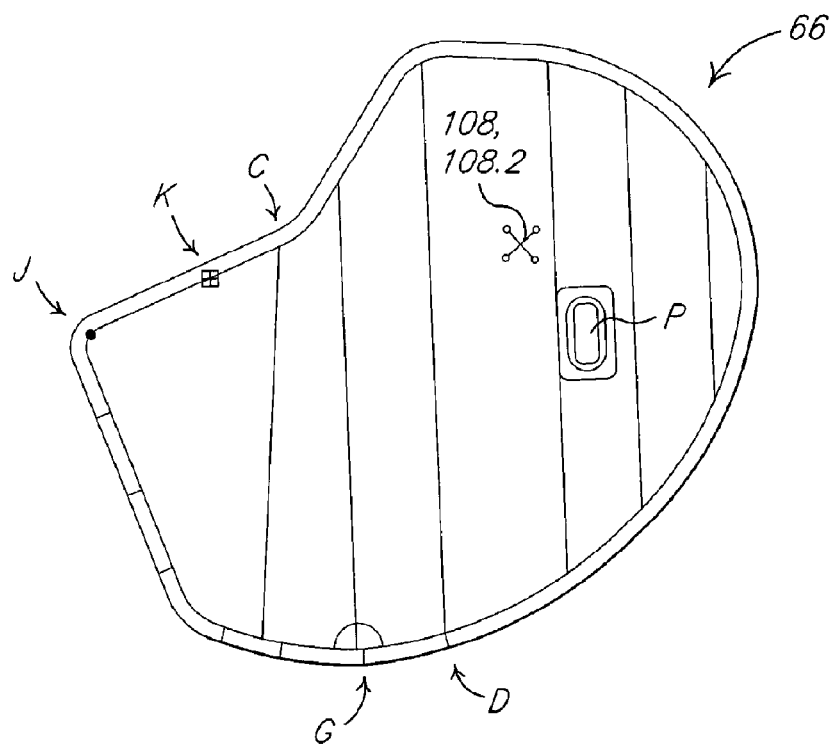
FIG. 19 illustrates a pattern of second lateral outboard panel of the second embodiment of the second aspect of the air bag.
Figure 20:
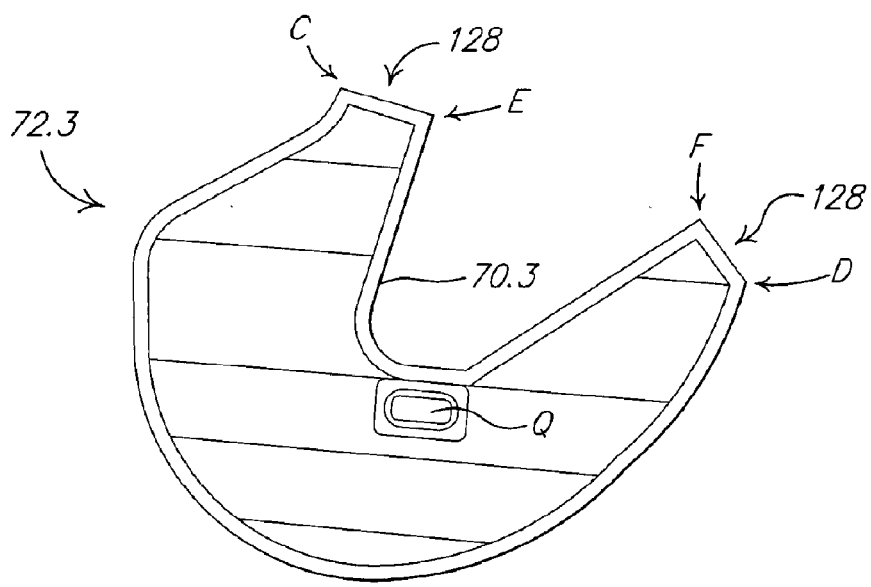
FIG. 20 illustrates a pattern of second inboard panel of the second embodiment of the second aspect of the air bag.
Figure 21:
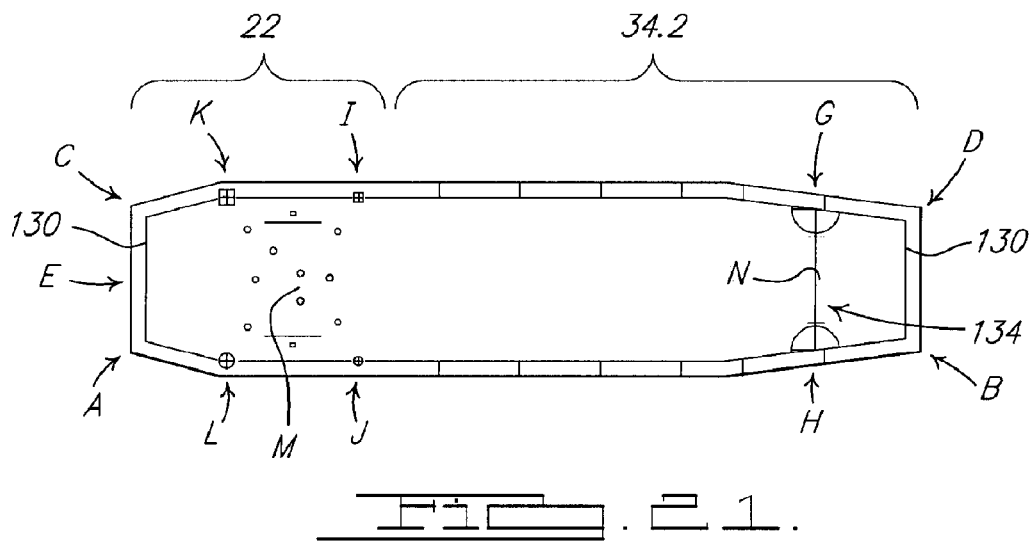
FIG. 21 illustrates a pattern of central panel of the second embodiment of the second aspect of the air bag.
Figure 22:
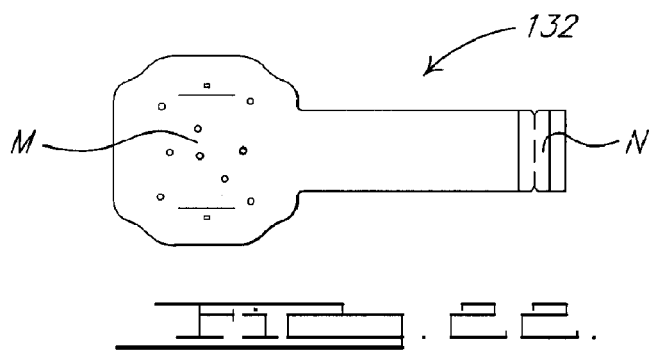
FIG. 22 illustrates a pattern of central tether of the second embodiment of the second aspect of the air bag.
Figure 23A:
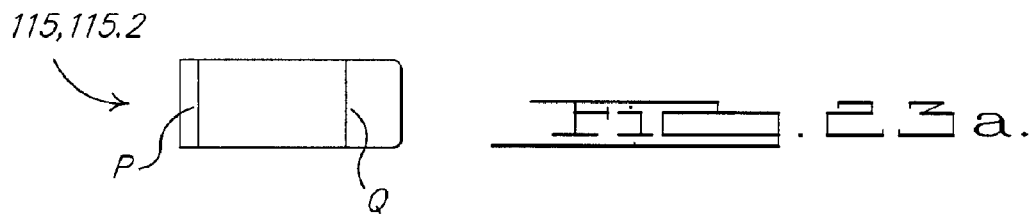
FIGS. 23a and 23b illustrates patterns of cross-tether of the second embodiment of the second aspect of the air bag.
Figure 23B:
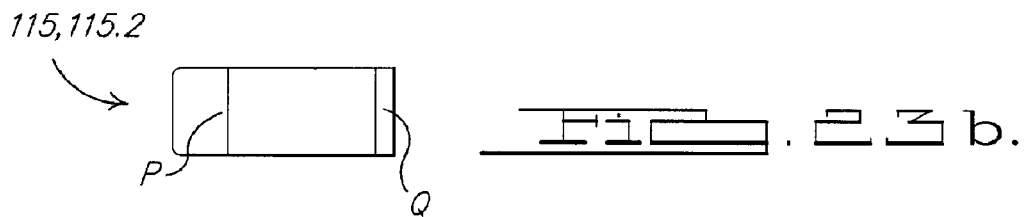

Referring to FIG. 16, a fourth embodiment of a second aspect of an air bag 10.2''' incorporates a central tether 132 operative between the first portion 22 of the central panel 12.3 operatively coupled to the vehicle 88, and a central tether attachment location 134 on the second portion 34.2 of the central panel 12.3, wherein the length of the central tether 132 is adapted so that upon inflation of the air bag 10.2''', the travel of the central tether attachment location 134 is constrained to short of the windshield 136 by about 40 to 150 millimeters, e.g. 100 millimeters, so as to improve the deployment of the air bag 10.2'''. It should be understood that a central tether 134 can be similarly incorporated in an embodiment of the first aspect of the air bag 10.1.

Referring to FIGS. 17-22, 23a and 23b, there are illustrated patterns of the associated components of the second embodiment of the second aspect of the air bag 10.2', wherein the letters A-N, P and Q designate locations that are aligned when joining the components together to assemble the air bag 10.2'.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. An air bag, comprising:
    a. at least one central panel adapted so as to form at least a portion of a manifold duct with first and second openings at opposite ends of said manifold duct, wherein a first portion of said at least one central panel constituting a first portion of said manifold duct incorporates a third opening adapted to receive inflation gas from a gas generator of an air bag inflator,
        said first portion of said at least one central panel comprises first and second opposite edges, the first edge forms a first boundary edge of the first opening and the second edge forms a first boundary edge for the second opening of said manifold duct,
        a second portion of said at least one central panel constituting a second portion of said manifold duct is operatively coupled to said first portion of said at least one central panel, the second portion extending at an angle from a third edge of the first portion of the central panel, said second portion of said at least one central panel comprises first and second opposite edges, the first edge forms a second boundary edge of the first opening and the second edge forms a second boundary edge of the second opening of said manifold duct,
        a third portion of said manifold duct is operatively coupled to said first and second portions of said at least one central panel, the third portion extending at an angle from a fourth edge of the first portion of the central panel, and said third portion of said manifold duct comprises first and second opposite edges, the first edge forms a third boundary edge of the first opening and the second edge forms a third boundary edge of the second opening of said manifold duct;
    b. a first lateral outboard panel, wherein a first edge portion of said first lateral outboard panel is operatively coupled to said first edge of said first portion of said at least one central panel, and a second edge portion of said first lateral outboard panel is operatively coupled to said first edge of said second portion of said at least one central panel;
    c. a second lateral outboard panel, wherein a first edge portion of said second lateral outboard panel is operatively coupled to said second edge of said first portion of said at least one central panel, and a second edge portion of said second lateral outboard panel is operatively coupled to said second edge of said second portion of said at least one central panel;
    d. a first lateral inboard panel; and
    e. a second lateral inboard panel, wherein a first edge portion of said first lateral inboard panel is operatively coupled either to a first edge of a third portion of said at least one central panel or to a first edge portion of said second lateral inboard panel, a remaining edge portion of said first lateral inboard panel is operatively coupled to a remaining edge portion of said first lateral outboard panel, said first lateral inboard panel and said first lateral outboard panel bound a first air bag cushion portion, said first edge portion of said second lateral inboard panel is operatively coupled either to a second edge of said third portion of said at least one central panel or to said first edge portion of said first lateral inboard panel, a remaining edge portion of said second lateral inboard panel is operatively coupled to a remaining edge portion of said second lateral outboard panel, said second lateral inboard panel and said second lateral outboard panel bound a second air bag cushion portion that is adapted to provide for cushioning an impact of said occupant or object with said second air bag cushion portion, and said third portion of said at least one central panel constituting said third portion of said manifold duct.

2. An air bag as recited in claim 1, wherein said third portion of said manifold duct comprises a third portion of said central panel.

3. An air bag as recited in claim 1, wherein at least a portion of said third portion of said manifold duct comprises a portion of said first lateral inboard panel.

4. An air bag as recited in claim 1, wherein at least a portion of said third portion of said manifold duct comprises a portion of said second lateral inboard panel.

5. An air bag as recited in claim 1, wherein said first edge of said manifold duct is located on said first lateral inboard panel.

6. An air bag as recited in claim 1, wherein said second edge of said manifold duct is located on said second lateral inboard panel.

7. An air bag as recited in claim 1, wherein a depth of said manifold duct is adapted so as to be sufficient to provide for mitigating injury to an occupant interacting directly therewith responsive to a crash of a vehicle in which the air bag is operative.

8. An air bag as recited in claim 1, wherein said manifold duct is adapted so that when the air bag is installed and inflated in a vehicle, a bottom of said first and second air bag cushion portions is substantially below a bottom of said manifold duct.

9. An air bag as recited in claim 1, further comprising at least one first tether operative between said first lateral inboard and outboard panels so as to limit a lateral extent of said first air bag cushion portion.

10. An air bag as recited in claim 9, further comprising at least one second tether operative between said second lateral inboard and outboard panels so as to limit a lateral extent of said second air bag cushion portion.

11. An air bag as recited in claim 10, wherein said first an second lateral inboard panels are operatively coupled to one another proximate to a location where said at least one first tether is operatively coupled to said first lateral inboard panel, and where said at least one second tether is operatively coupled to said second lateral inboard panel.

12. An air bag as recited in claim 1, wherein said first and second lateral inboard panels are operatively coupled to one another at a location between said manifold duct and a portion of said first and second lateral inboard panels distal with respect to said manifold duct.

13. An air bag as recited in claim 1, wherein the air bag is adapted for a top-mount installation in a vehicle.

14. An air bag as recited in claim 13, further comprising at least one third tether operative between said first and second portions of said central panel, wherein a length of said at least one third tether is less than a distance along said at least one third tether between an instrument panel and a windshield of said vehicle when the airbag is deployed in said vehicle.

15. An air bag as recited in claim 1, wherein at least one of said first lateral outboard panel and said second lateral outboard panel is adapted with at least one vent.

16. A method of providing for protecting an occupant of a vehicle with an air bag responsive to a crash, comprising:
 a. providing for a first air bag cushion portion of an air bag;
 b. providing for a second air bag cushion portion of said air bag;
 c. providing a manifold duct of said air bag for receiving inflation gas from an air bag inflator and for distributing said inflation gas to said first and second air bag cushion portions, wherein said first and second air bag cushion portions are lateral of said manifold duct and extend further towards an occupant than said manifold duct so as to provide for a bi-lobular air bag, and wherein the manifold duct includes first and second openings at opposite ends of said manifold duct, wherein a first portion of the manifold duct incorporates a third opening adapted to receive inflation gas from a gas generator of an air bag inflator, the first portion of the manifold duct comprises first and second edges respectively common with said first and second openings of said manifold duct; and
 d. providing sufficient depth of said manifold duct so as to restrain a occupant interacting therewith between said first and second air bag cushion portions.

17. A method of providing for protecting an occupant of a vehicle with an air bag responsive to a crash as recited in claim 16, further comprising providing for limiting an extent of deployment of a portion of said manifold duct during a deployment of the air bag,
 wherein said portion of said manifold duct would otherwise be proximate to a windshield when said air bag is deployed in the vehicle.

* * * * *